United States Patent [19]

Davison

[11] 4,230,436
[45] Oct. 28, 1980

[54] ROTOR/SHROUD CLEARANCE CONTROL SYSTEM

[75] Inventor: Samuel H. Davison, Cincinnati, Ohio

[73] Assignee: General Electric Company, Cincinnati, Ohio

[21] Appl. No.: 925,352

[22] Filed: Jul. 17, 1978

[51] Int. Cl.³ .............................................. F01D 11/08
[52] U.S. Cl. .................................... 415/1; 415/51; 415/138; 415/175
[58] Field of Search ............ 415/110, 116, 117, 134, 415/138, 175, 1, 51, 176; 60/39.14, 39.66

[56] References Cited

U.S. PATENT DOCUMENTS

| | | | |
|---|---|---|---|
| 3,391,904 | 7/1968 | Albert et al. | 415/116 |
| 3,453,825 | 7/1969 | May et al. | 60/39.66 |
| 3,583,824 | 6/1971 | Smuland | 415/134 |
| 3,584,458 | 6/1971 | Wetzler | 415/115 |
| 3,966,354 | 6/1976 | Patterson | 415/134 |
| 3,975,901 | 8/1976 | Hallinger et al. | 415/117 |
| 4,005,946 | 2/1977 | Brown | 415/136 |
| 4,069,662 | 1/1978 | Redinger et al. | 415/138 |
| 4,102,595 | 7/1978 | Wibbelsman | 415/1 |
| 4,117,669 | 10/1978 | Heller | 415/116 |

FOREIGN PATENT DOCUMENTS

1248198 9/1971 United Kingdom .

Primary Examiner—Everette A. Powell, Jr.
Assistant Examiner—A. N. Trausch, III
Attorney, Agent, or Firm—Dana F. Bigelow; Carl L. Silverman; Derek P. Lawrence

[57] ABSTRACT

Cooling airflow to the shroud support apparatus is varied in response to both rotor speed and elapsed time above a predetermined level by the selective use and mixture of two air sources at different temperatures. For steady-state operation, each of four different operating modes has its prescribed cooling air delivery mode such that, generally, as the engine speed and cycle temperatures increase, so does that of the cooling air. For transient operation, a timer is employed to sequence the desired cooling air delivery modes in such a manner as to maintain optimum rotor-to-shroud clearances during the transient period.

37 Claims, 20 Drawing Figures

ROTOR/SHROUD CLEARANCE CONTROL SYSTEM

BACKGROUND OF THE INVENTION

This invention relates generally to gas turbine engines and, more particularly, to a method and apparatus for minimizing rotor/shroud clearance during both steady-state and transient operation.

As turbine engines continue to become more reliable and efficient by changes in methods, designs and materials, losses which occur from excessive clearances between relatively rotating parts become more important in the many design considerations. In many turbine engine applications, there is a requirement to operate at variable steady-state speeds and to transit between these speeds as desired in the regular course of operation. For example, in a jet engine of the type used to power aircraft, it is necessary that the operator be able to transit to a desired speed whenever he chooses. The resulting temperature and rotor speed changes bring about attendant relative growth between the rotor and the surrounding shroud and, in order to maintain the desired efficiency, this relative growth must be accommodated. The primary concern is in maintaining a minimum clearnace between the stator and rotor while preventing any interference therebetween which would cause rubbing and resultant increase in radial clearance during subsequent operation. When considering the transient operating requirements as mentioned hereinabove, the relative mechanical and thermal growth patterns between the rotor and the shroud prevent a very difficult problem.

One of the primary reasons for wanting to maintain close clearance control during transient operating conditions as well as steady-state conditions is that of minimizing temperature overshoot in the engine. That is, during transient operation at a given thrust level, the turbine inlet temperature of the engine will exceed that for the same thrust level at a steady-state, stabilized condition, and the difference is known as the temperature overshoot. Higher temperature overshoots impose higher thermal gradients to the hot flow path parts and tend to reduce life in these parts. It will be understood that as turbine/shroud clearances are increased, and thus turbine efficiencies are decreased, it is necessary to operate at higher temperatures in order to meet designated thrust levels. Thus, greater clearances necessarily mean higher temperature overshoots and, conversely, temperature overshoots can be reduced by closely controlling these clearances.

Other reasons for close clearance control during transient and steady-state operation include the desirability of increasing stall margin and decreasing acceleration time.

Various schemes have been devised to variably position the stationary shroud in response to engine operating parameters in order to reduce rotor/shroud clearance. One such scheme is that of the thermal actuated valve as described in U.S. Pat. No. 3,966,354, issued on June 29, 1976 and assigned to the assignee of the present invention. In that apparatus, a valve operates in response to the temperature of the cooling air and, to the extent that the cooling air temperature is dependent on the speed of the engine, the transient condition is considered. However, such a system tends to be relatively slow in responding and relatively inaccurate in trying to match relative growth during transient operation.

Probably the primary reason that a cooling air system operating only on a speed responsive schedule is inadequate is that such a system is not capable of taking into account the thermal heating and cooling time constants of the rotor for all possible sequences of transitional operation. That is, present systems are only capable of matching thermal time constants of the rotor when the sequence of transient condition operation is known. This, of course, is not acceptable since the particular operating mode and sequence of operation is going to depend on the mission at hand.

It is therefore an object of the present invention to provide an efficient turbine engine which is capable of transiting between various speeds while maintaining a minimum clearance between its rotor and shroud.

Another object of the present invention is the provision in a turbine engine for responsively modulating the position of a rotor shroud in response to variable steady-state and transient operating conditions.

Yet another object of the present invention is the provision for reducing temperature overshoot during transient operation.

Still another object of the present invention is the provision in a gas turbine engine for increasing stall margin and decreasing acceleration time.

Yet another object of the present invention is the provision in a clearance control system for selectively varying the shroud position in response to the thermal time constants of the rotor.

Still another object of the present invention is the provision for a rotor/shroud clearance control system which is responsive and effective over a wide range of steady-state and transient operating conditions.

Yet another object of the present invention is the provision for a rotor/shroud clearance control system which is economical to manufacture and relatively simple in operation.

These objects and other features and advantages become more readily apparent upon reference to the following description when taken in conjunction with the appended drawings.

Briefly, in accordance with one aspect of the invention, a cooling air system is made more responsive and versatile by the use of two sources of air at different temperatures and providing for the use of those sources individually or together so that a total of four different cooling modes or temperatures may be used. Selection of the cooling mode or modes is determined automatically in response to the particular speed range in which the engine is operating and of the time it is operating within that range.

By another aspect of the invention, cooling air is scheduled to flow to the shroud support structure at a particular temperature sequence which corresponds to the thermal time constants of the rotor. In this way, the system operates in response to engine speed and time of operation of modulate the temperature of the cooling air flow in such a way as to obtain the optimum rotor/shroud clearance control during both transient and steady-state operations.

By yet another aspect of the invention, the speed of the rotor is sensed and, when the speed reaches a predetermined level, a timer is started and cooling air is sent to the support structure in accordance with a predetermined mixture schedule. This schedule is closely matched to the thermal time constants of the rotor and may be overridden by the rotor's attaining another predetermined speed wherein another cooling air mode of operation will be put into effect.

By still another aspect of the invention, cooling air temperatures are selectively varied by mixing air which is bled off from the fifth and the ninth stages of the compressor. Four different increasing levels of cooling air temperature can then be obtained by having either no air, fifth stage air only, a mixture of fifth and ninth stage air, or ninth stage air only. The particular sequence is determined by the speed of the rotor and the particular temperature is determined by the time of operation within that speed range.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
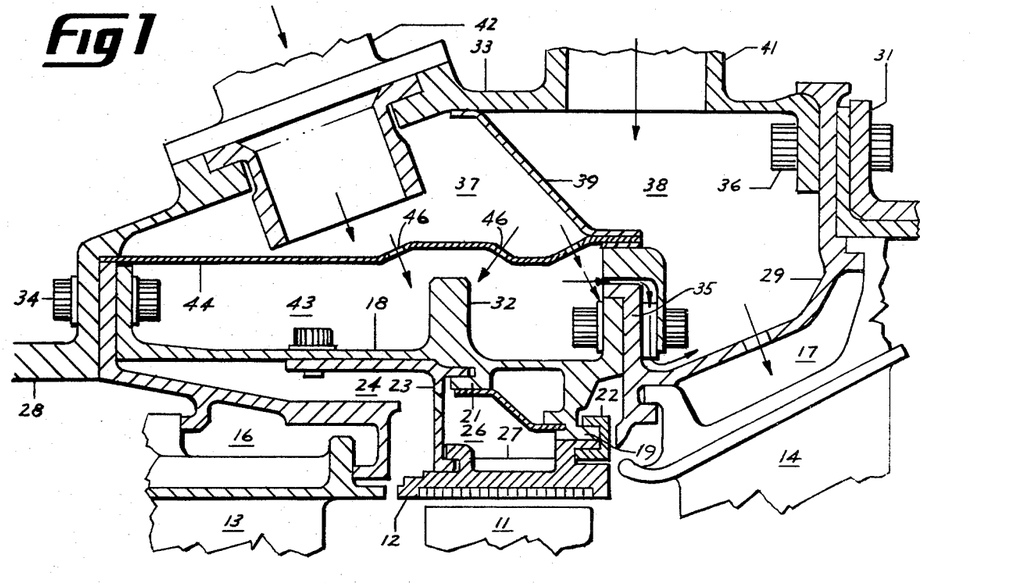
FIG. 1 is an axial cross-sectional view of the turbine shroud support portion in accordance with the preferred embodiment of the invention.

Referring now to FIG. 1 there is shown a portion of a typical gas turbine engine which includes a row of circumferentially spaced high pressure turbine blades 11 which are closely circumscribed by a plurality of circumferentially spaced shroud segments 12. As in conventional operation of a single-stage high pressure turbine, the hot exhaust gases from the combustor (not shown) pass through a row of high pressure nozzles 13, through a row of turbine blades 11 to impart rotary motion thereto, and downstream to a row of low pressure nozzles 14. Cooling air is provided to the high pressure nozzles 13 and the low pressure nozzles 14 by way of cooling plenums 16 and 17, respectively, in a manner well known in the art.

The shroud segments 12 are supported by a shroud support structure 18 having inner flanges 19 and 21 which are interconnected with the shroud segments by way of an annular clamp bracket 22 and support bracket 23, respectively. In order to cool the shroud segments 12, it is common to pass cooling air from a cavity 24 through the support bracket 23 to the cavity 26 where it passes through perforations in a baffle 27 to impinge on and cool the shroud segments 12.

The shroud support ring 18, which is supported at its forward end by attachment to the combustor casing 28 and, at its rear end by attachment to the nozzle support element 29 and the low pressure turbine casing 31, includes a middle flange 32 and an aft flange 35. These flanges are of substantial thickness and radial height such that they represent a substantial portion of the mass of the entire shroud support structure 18. It will be understood that by selectively controlling the temperature, and thus the thermal growth, of these flanges, the radial position of the shroud segment structure 18 and thus that of the shroud segments 12 can be modulated to follow the mechanical and thermal growth of the rotor blade 11 in order to minimize the clearance between the blades 11 and the shroud segments 12 during both steady-state and transient operating conditions.

Surrounding the shroud support structure is a manifold 33 which is connected at its forward end to a combustor casing 28 by a plurality of fasteners 34 and, at its rearward end to the turbine casing 31 by a plurality of fasteners 36. The manifold 33 defines the outer side of a high pressure cooling air plenum 37 and a lower pressure cooling air plenum 38, with the two plenums 37 and 38 being separated by a wall 39 which may include provision for the flow of some air between the plenums as shown by the arrows. Thus, the lower pressure cooling air plenum 38 may be supplied with cooling air by way of the high pressure cooling air plenum 37, by air crossing the top of flange 19 after impingement, and/or by way of a separate supply conduit 41 as shown. Cooling of the low pressure nozzles is accomplished by a manner well known in the art.

Leading into the high pressure cooling air plenum 37 is a bleed air conduit 42 which receives bleed air from the compressor, at varying temperatures, in a manner to be more fully described hereinafter. Defining the radially inner boundary of the cooling air plenum 37 and the radially outer boundary of an inner plenum 43, is an impingement ring 44 having a plurality of circumferentially spaced holes 46 disposed therein for impinging the relatively higher pressure air from the plenum 37 against the surfaces of the middle flange 32 and the aft flange 35 to control the temperature thereof. The impinged air then passes from the relatively intermediate pressure plenum 43 in a conventional manner for cooling other elements of the engine.

Figures 2, 3, 4, 5, 6:
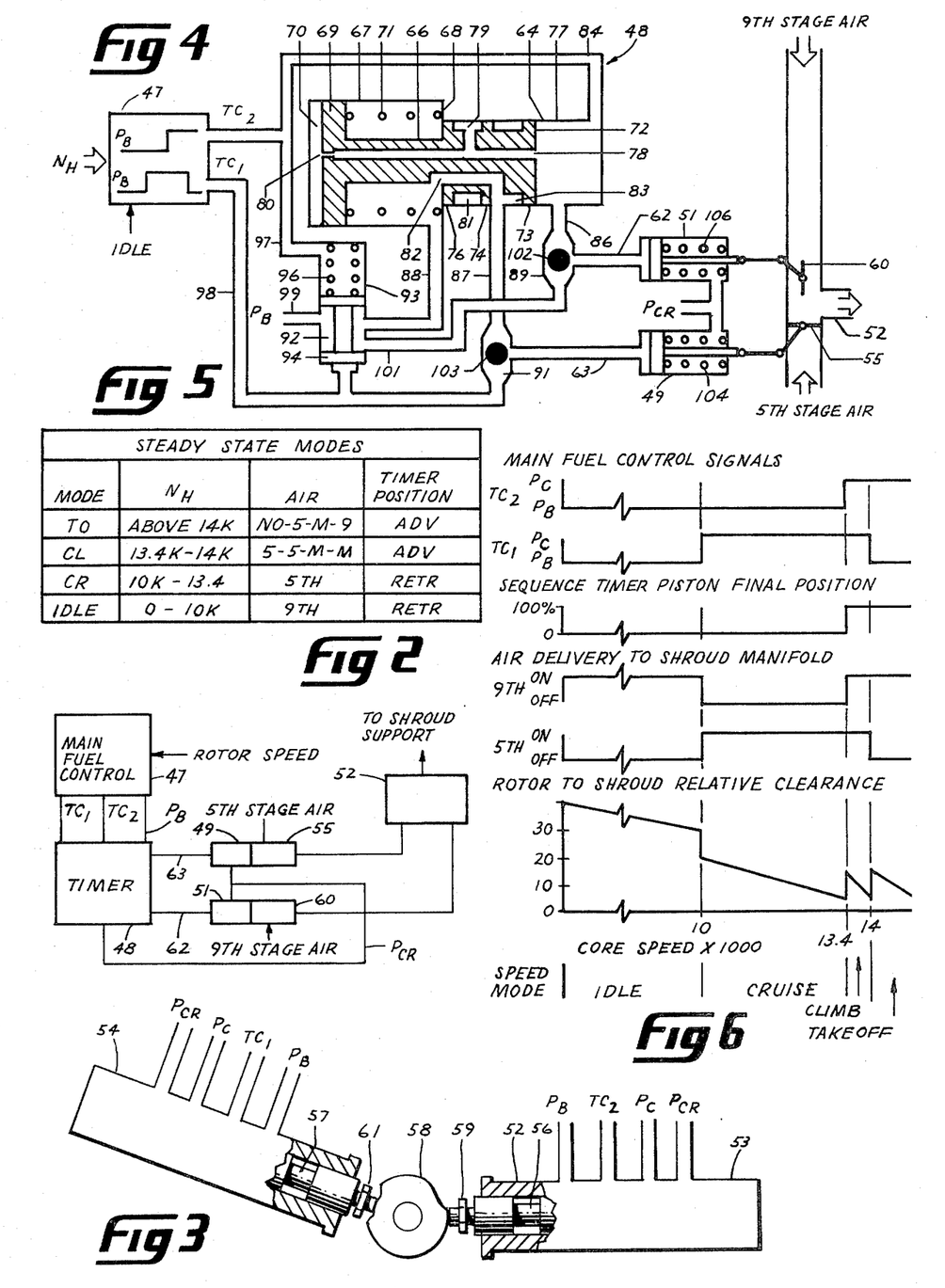
FIG. 2 is a schematic illustration of the turbine shroud cooling system in accordance with the preferred embodiment of the invention.
FIG. 3 is a cross-sectional view, partially shown in schematic, of the speed sensing portion of the preferred embodiment of the invention.
FIG. 4 is a cross-sectional view, partially shown in schematic, of the timer and air valve portion of the invention.
FIG. 5 is a table showing the steady-state modes of operation of the present invention.
FIG. 6 is a graphic illustration showing the relationship of the various parameters during steady-state operation.

Scheduling the flow of cooling air to the high pressure cooling air plenum 37 by way of the bleed air conduit 42 is accomplished by way of the system shown generally in FIG. 2. Here a main fuel control 47, which receives an input indicative of the rotor speed, provides a plurality of hydraulic pressure outputs that are used to operate a timer 48 and a pair of air valve actuators 49 and 51 with air valves 55 and 60, respectively, for the scheduling of air to a manifold 52 and hence to the shroud support by means of duct 42.

Within the main fuel control 47 there is a pair of pressure balanced hydraulic signal valves 53 and 54 (see FIG. 3) with plungers 56 and 57, respectively, whose positions are controlled by a cam 58 which engages the respective valve stems 59 and 61. The cam 58 is positioned in response to a core speed tachometer which is normally used for scheduling acceleration fuel flow and compressor stator position. This two-valve system incorporates a specific speed hysteresis band at each switch point to prevent the system from alternating back and forth between modes when operating near a switch point speed. The cam profile drives the inner valve stem of each of the valves such that once the switch point displacement is achieved, the trapped plunger moves by the differential pressure to the opposite extreme of its travel within the stops of the valve stem. Therefore the speed must change by the amount corresponding to the plunger travel before the signal returns to its original valve clearances. Since the travel of the plunger is limited to the range corresponding to the speed hysteresis band, the resulting effect upon the shroud clearances is minimal.

Each of the signal valves 53 and 54 has three hydraulic pressure inputs which are readily obtainable from the existing state-of-the-art fuel control system. The inputs are $P_B$ (boost pressure), $P_{CR}$ ($P_B+100$ psi) and $P_C$ ($P_B+200$ psi). The respective plungers 56 and 57 are then positioned by the cam 58 to obtain combinations of these pressures in the respective signal valves to produce output turbine clearance signals $TC_2$ and $TC_1$ which will be equal to either $P_B$ or $P_C$. These two hydraulic signals $TC_1$ and $TC_2$, along with the hydraulic signal $P_B$, are then sent to the timer 48 which in turn generates hydraulic signals along lines 62 and 63 to operate the air valve actuators 51 and 49, respectively. These valve actuators also receive a $P_{CR}$ pressure input signal for use as a reference pressure. They then operate the air valves 60 and 55 in response to the hydraulic signals from the timer 48 to present different combinations of fifth and ninth stage cooling air to the air valve discharge port or manifold 52 for use in controlling the temperature of the shroud support.

Referring now to FIG. 4, the timer apparatus 48 is shown to have a two-diameter cylinder 64 and a two-diameter piston 66. Disposed in the cylinder larger end 67 between its one wall 68 and the piston larger end 69 is a helical spring 71 which tends to bias the piston toward the head end cavity 70 in the left end of the cylinder 64. The piston smaller end 72 includes three axially spaced lands 73, 74 and 76 which extend radially outward to be in close diametrical clearance with the internal wall of the cylinder smaller end 77. The piston 66 has a passage 78 extending axially from one end to the other, an orifice 80 has its one end to meter the fluid flow to the head end cavity 70, and a port 79 which fluidly connects the passage 78 to a cavity 81 between the lands 74 and 76. The piston smaller end 72 also includes a passage 82 which fluidly connects a cavity 83 between the lands 73 and 74 to the cylinder larger end 67.

Hydraulic connections to the cylinder 64 are made at its smaller end by lines 84, 86 and 87 and to its larger end by line 88. The line 84 comes into the end of the cylinder smaller portion 77 and carries a hydraulic fluid at a pressure designated $TC_2$ which emanates from the signal valve 53 located in the main fuel control 47. Line 86 is connected at its one end to the side of the cylinder smaller portion 77 and, at its other end to one end of a maximum pressure selector 89. Line 87 is connected at its one end to the cylinder smaller end 77 and, at its other end, to one end of a maximum pressure selector 91. Line 88 is connected at its one end to the wall 68 of the cylinder larger end 67 and at its other end to a mixing valve 92. The mixing valve 92 comprises a cylinder 93 having a double-ended piston 94 disposed therein and a helical spring 96 biasing the piston 94 in the downward position as shown. The upper end of the cylinder 93 is fluidly connected by line 97 to the signal valve 53 of the main fuel control 47 to present a $TC_2$ fluid pressure thereto. The lower end of the mixing valve 92 is connected by hydraulic line 98 to the other signal valve 54 in the main fuel control 47 to receive the $TC_1$ fluid pressure signal. The hydraulic line 88, which connects to the cylinder larger end 67 comes into the mixing valve 92 at a point intermediate the two ends, and other hydraulic line 99 carrying fluid at a pressure $P_B$ also comes into the cylinder 93 at substantially the same axial point. Finally, a hydraulic line 101 leads from a point at the lower end of the cylinder 93 to the other end of the maximum pressure selector 89. Operation of the mixer valve 92 under varying conditions will be described hereinafter.

Referring now to the maximum pressure selector valves 89 and 91, there are included the respective balls 102 and 103 whose positions are determined by the pressures acting thereon such that they allow only the highest pressure to which they are exposed to flow to the respective air valve actuators 51 and 49. For example, in the maximum pressure selector valve 89, the ball 102 is exposed to the pressures in lines 86 and 101 and moves to allow only the higher pressures to enter the line 62 and into the one end of the air valve actuator 51. Similarly, the valve 91 operates to only allow the higher pressure from the line 87 and the line 98 to flow into the line 63 and into the one end of the air valve actuator 49.

As shown in FIG. 4, the air valve 55 is normally closed and its actuator 49 is biased by a helical spring 104 as well as a hydraulic fluid at a pressure $P_{CR}$. The air valve 60 is a normally open valve and its actuator 51 is biased by a helical spring 106 and a hydraulic fluid at a pressure of $P_{CR}$.

Operation of the timer 48 at steady-state idle speed condition will now be described. At idle speed, the cam 58 (see FIG. 3) moves the plungers 56 and 57 to the positions such that the low pressure $P_B$ exists at both the $TC_1$ and $TC_2$ signal points. The low fluid pressure then exists within the line 84 shown in FIG. 4, cylinder smaller end 77, the passage 78 and the head end cavity 70, to act on the piston larger end 69. The other side of the piston 69 larger end is acted upon by the same low $P_B$ pressure from line 99 through mixing valve 92 by means of line 88. Since the pressures are equal, the piston 66 remains in that position. The same low pressure exists in line 86 and, since the fluid is entering the mixing valve 92 by way of line 99 at a pressure $P_B$, the pressure in line 100 is also at a low $P_B$ pressure. Accordingly, the pressure in line 62 is at $P_B$ and the spring 106 and the fluid at pressure $P_{CR}$ hold the actuator 51 retracted and the valve 60 in the open position to allow for the flow of ninth stage air to the valve discharge port 52.

At the same time, the fluid at a low pressure $P_B$ exists in the line 98, the one end of the maximum pressure selector 91 and in the line 63 at the left end of the air valve actuator 49. The other side of the air valve 49 actuator has the force of spring 104 and fluid pressure $P_{CR}$ on it and therefore the valve 55 is held in its normally closed position to prevent the flow of fifth stage air into the air valve discharge port 52.

The mixing valve 92 has hydraulic fluid at a low pressure $P_B$ in both ends thereof and therefore the piston 94 remains in its downwardly biased position as shown.

Operation of the system in the steady-state idle mode of operation is intended to employ relatively hot ninth-stage air to establish the shroud position promptly and provide the necessary clearance margin for operation as will be more fully discussed hereinafter. In addition to the idle mode of operation, the system is designed to operate over the entire core speed range, and for the purpose of this description is illustrated for a standard day in terms of the steady-state operating modes, cruise, climb and takeoff as shown in the table of FIG. 5. It will be recognized that these modes for steady-state operation employ increasingly hotter air as the entire speed and temperatures increase in order to match the thermal growth of the rotor. That is, after the initial start and idle operation, the coolest source of air from the fifth stage is used in the cruise range of 10,000 to 13,400 rpm, then the fifth and ninth stages are mixed for the climb range of 13,400 rpm to 14,000 rpm and finally only the ninth stage air is used in the steady-state takeoff mode of operation, above 14,000 rpm so as to ensure adequate clearance during hot day takeoff operation.

It will be recognized by reference to the table of FIG. 5 that for both the idle and cruise modes of operation, the timer piston 66 will remain in the retracted position as shown in FIG. 4 or, as will be more clearly seen hereinafter, if the engine has been operating at a higher speed and decreases to either of those speed ranges then the timer piston 66 will be retracting such that it is moving leftward to the position as shown in FIG. 4. In the other two modes of operation, for climb and takeoff, the timer piston 66 is advancing to schedule the increasing air temperatures as indicated.

There is shown graphically in FIG. 6 the various control signals, the piston final positions, the air sources applied and the rotor-to-shroud clearances which correspond to the respective steady-state modes of operation. During the idle mode, both the $TC_1$ and $TC_2$ have the low $P_B$ pressure signals so that the piston is in the far left position. Only the ninth stage air is turned on such that the rotor-to-shroud clearance is at a maximum level possible for this speed. As the speed is increased to the cruise range, the $TC_1$ control signal is increased to the $P_C$ level such that the ninth stage air is turned off and the fifth stage air is turned on. This results in a substantial decrease in the rotor-to-shroud clearance, and this clearance continues to decrease as the speed is increased to the climb range. At that point, the $TC_2$ signal is increased to the $P_C$ level and the sequence timer piston moves to its final position to the far right. The ninth stage air is then turned on to present a mixture of fifth and ninth stage air and increase the rotor-to-shroud clearance to an acceptable level as shown. Again, this clearance decreases as speed increases to the takeoff level wherein the $TC_1$ signal is decreased to the $P_B$ level and the fifth stage air is removed to again present an increased rotor-to-shroud clearance so as to allow for further increases of speed without attendant rub.

Figure 7:
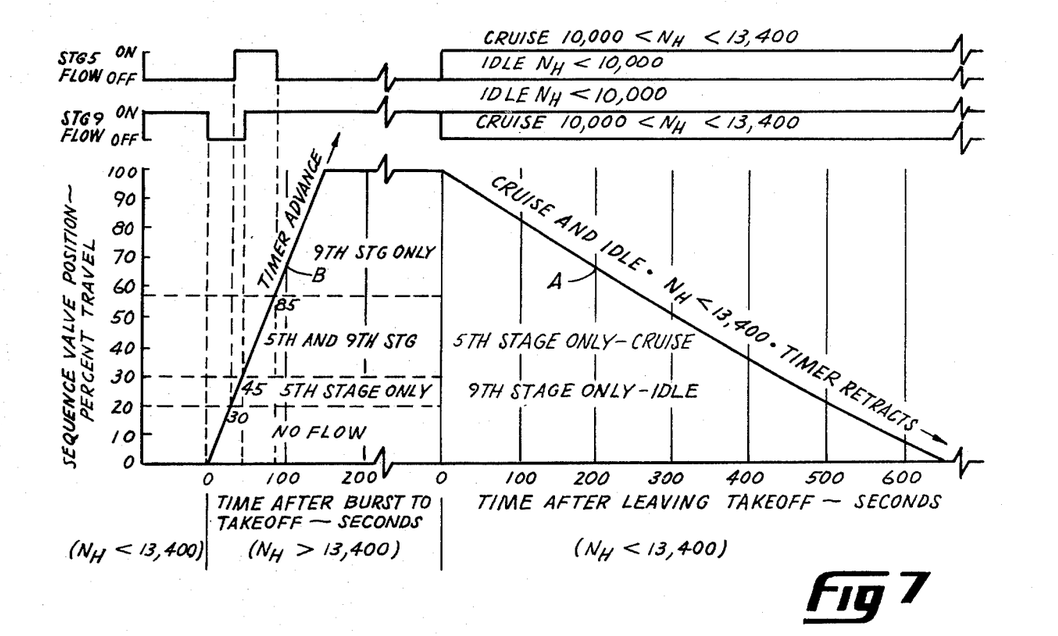
FIG. 7 is a graphic illustration of various sequence valve positions and air valve positions as a function of time.

Considering now the operation of the system under transient conditions, there is shown in FIG. 7 a graphic illustration of the timer valve piston positions and air valve positions for an engine which operates from the idle condition to the takeoff position and back down to the cruise/idle condition. In following through these sequences, the valve positions will be examined in relation to the controlling parameters and the time by reference to FIGS. 8a through 8m.

As illustrated in FIG. 4, when the engine is in the idle position, the ninth stage air is being delivered to the shroud support to provide an adequate clearance between the rotor and the shroud. When the engine is accelerated to the takeoff range, the system will begin to function as shown in FIGS. 8a and, as time progresses, it will sequence through the functions as illustrated by FIGS. 8b, 8c and 8d.

Figure 8A:
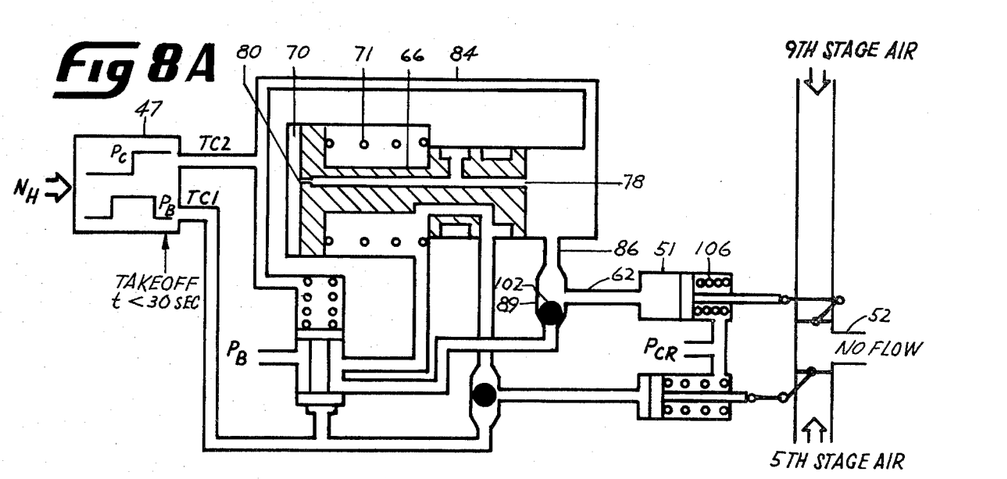
FIGS. 8a through 8m are schematic illustrations of the sequence of valve and air valve positions as they are sequenced through a typical cycle of operation.

Referring now to FIG. 8a, the hydraulic signal $TC_1$ is at a low $P_B$ level and the signal $TC_2$ is at a high $P_C$ level. Accordingly, the high pressure fluid in the line 84 passes through the passage 78, the orifice 80, and into the head end cavity 70 at the left end of the piston 66 to cause it to start moving to the right. At the same time, the high pressure fluid in the line 86 moves the ball 102 of the pressure selector 89 down to allow the high pressure fluid to flow into the line 62 to act against the spring 106 and the $P_{CR}$ pressure of the air valve actuator 51 to extend the piston and to close off the ninth stage air. The remaining portion of the circuit remains at a low pressure $P_B$ condition. This no-flow condition is represented by the first 30 seconds of operation wherein the timer valve piston moves 20% of its travel to the right as indicated in FIG. 7.

Figure 8B:
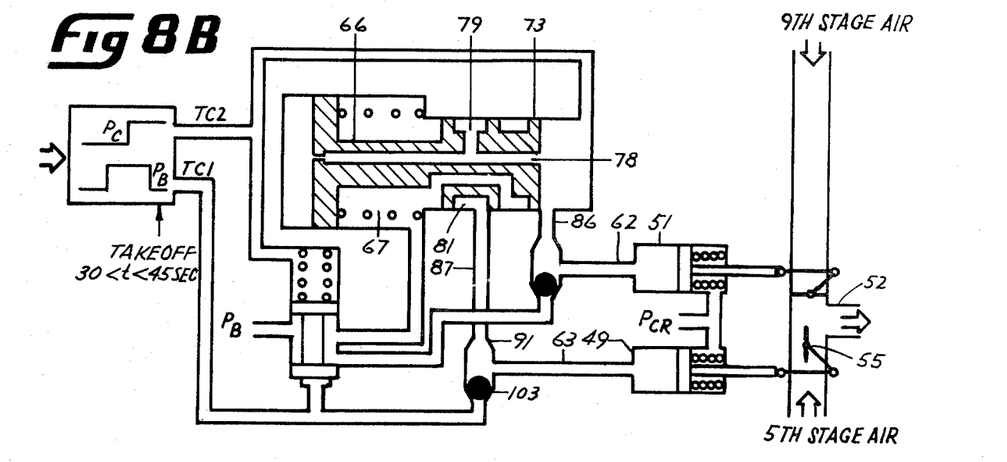

After 30 seconds, the piston 66 has moved to the right to the position as shown in FIG. 8b. At this point the high pressure fluid enters the port 79 and the cavity 81 to then flow into the line 87 where the ball 103 in the maximum pressure selector 91 is moved down as shown. The high pressure fluid enters the line 63 and overcomes the spring force and $P_{CR}$ pressure to extend the actuator 49 and to open normally closed valve 55 which allows the fifth stage air to enter the valve discharge port 52. This condition exists for fifteen seconds as the piston 66 moves to the 30% position as shown in FIG. 7.

Figure 8C:
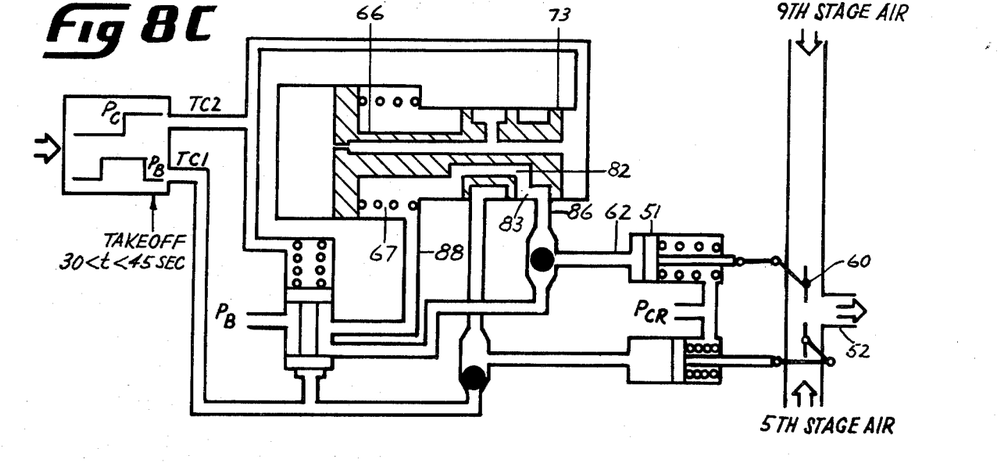
Figure 8D:
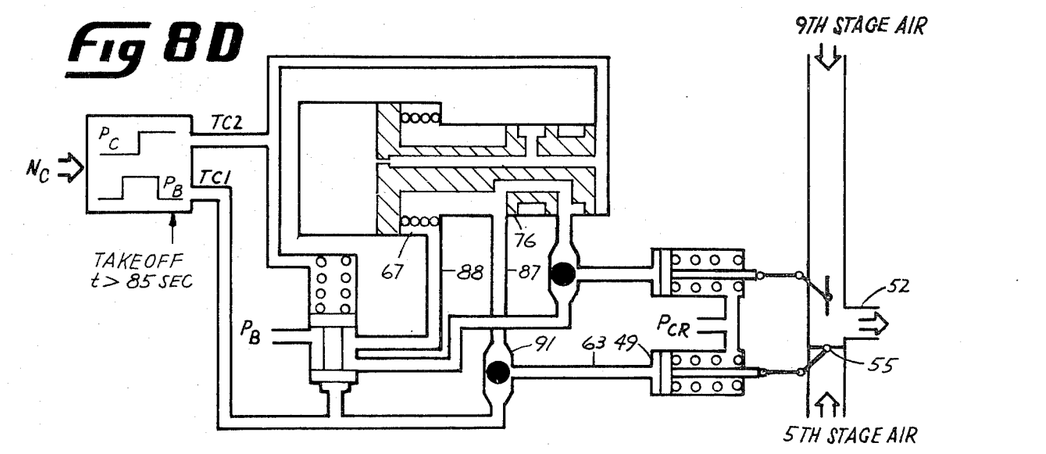

After forty-five seconds, the land 73 of the piston 66 passes to the right of the port going to the line 86 and thereby cuts off the supply of high pressure fluid to that line (see FIG. 8c). The line 86 is then exposed to a low pressure $P_B$ fluid which enters by way of the line 88, the cylinder large end 67, the passage 82, and the cavity 83. The pressure in the line 62 then drops to the low $P_B$ level and the $P_{CR}$ pressure retracts the actuator to move the air valve 60 to the normally open position. The ninth stage air then comes into the discharge port 52 to present a fifth and ninth stage mixture which remains for the next forty seconds as the piston 66 advances to the fifty-seven percent position as shown in FIG. 7.

After a total of 85 seconds (see FIG. 8), the land 76 passes to the right of the port entering the line 87 and a low pressure $P_B$ fluid exists in the line 88, the cylinder large end 67, to present a low pressure condition to the maximum pressure selector 91. Since there is a low pressure presented at both sides of the maximum pressure selector 91, a low pressure fluid exists in the line 63 and the $P_{CR}$ pressure returns the actuator 49 to the left to place the air valve 55 to its normally closed position as shown to shut off the supply of fifth stage air. As indicated in FIG. 7, this condition exists between the eighty-five second and one hundred fifty second time period as the piston 66 moves to the full right position. This continued advancement beyond the point where the air valve 55 is closed, is referred to as overtravel and is included in the design to extend the retraction time of the timer piston so as to allow the rotor to cool sufficiently to permit speed rebursts without attendant rub. This will be more clearly described hereinafter.

As long as the rotor speed remains above the 14,000 rpm level, the piston will remain in the far right position and the ninth stage air will continue to flow to the shroud support. When the speed is now cut back from the takeoff speed of 14,000 rpm to a reduced speed which demands another steady-state mode as, for example, a climb range of 13,400 to 14,000 rpm or the cruise range from 10,000 to 13,400 rpm, then the system changes to provide different cooling modes. For example, if the speed is dropped to within the 13,400 to 14,000 rpm range, a mixed fifth and ninth stage flow will occur immediately. If the speed is dropped down into the cruise range the system will immediately adjust to provide only fifth stage air to the manifold. At this point, when the speed drops below the 13,400 rpm level the timer begins to retract and follow the downward slope as indicated in FIG. 7. Note that the timer piston takes only 150 seconds to advance completely to the right and takes 650 seconds to retract completely to the left side. Since the rotor takes more time to cool down at low speeds than it takes to heat up at high speeds, this slower retraction is necessary in order to prevent rotor-to-shroud rubs during a reburst to high thrust. As will be seen, the overtravel of the piston for a period of sixty-five seconds will result in an additional retraction time of approximately 250 seconds. This time allows the high inertia rotor to cool down sufficiently while the shroud cooling system remains in the hotter operating modes such that a reburst to climb, for example, will not result in a rub.

Figure 8E:
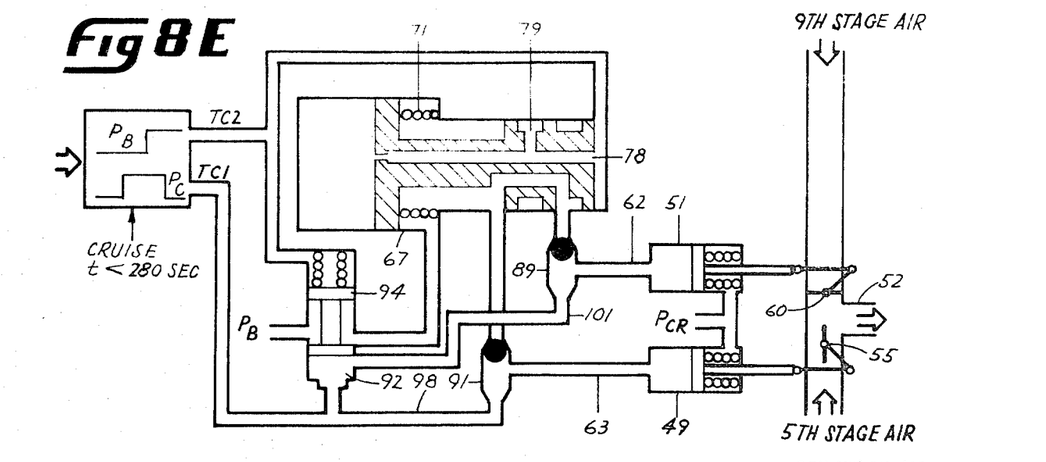
Figure 8F:
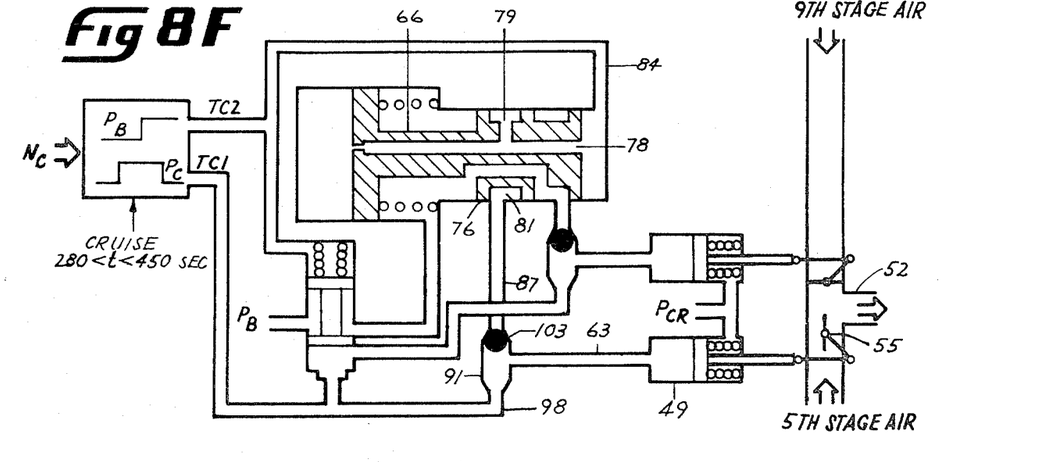

When the speed is reduced to a level below 13,400 rpm, the piston will retract toward the left and the fifth stage air valve will remain open as shown in FIGS. 8e through 8h. Referring to FIG. 8e, when the speed drops below the 13,400 rpm level, the $TC_1$ and $TC_2$ signals switch such that the $TC_1$ is a high $P_C$ pressure and $TC_2$ is a low $P_B$ pressure. The higher level $TC_1$ pressure signal exists in the line 98, in the maximum pressure selector 91 and in the line 63 allowing $P_C$ to open the normally closed air valve 55 to allow the fifth stage air to flow into the air valve discharge port 52. At the same time, the high pressure signal at $TC_1$ enters the mixing valve 92 to move the piston 94 to the upward position and establish the high pressure fluid in the line 101, the maximum pressure selector 89, and the line 62 to close the normally open air valve 60 to prevent the ninth stage air from entering the air valve discharge port 52. The low pressure $TC_2$ signal $P_B$ whch passes through the passage 78 and orifice 80 to the head end cavity 70 is insufficient to overcome the force of the helical spring 71 and thus the piston 66 begins to retract toward the left. At the end of a 250-second period, the piston 66 has come to the position as shown in FIG. 8f wherein the land 76 has passed to the left side of the port entering the line 87 such that the low pressure from line 84 exists in the port 79, the cavity 81 and the line 87. The ball 103 of the maximum pressure selector 91 is then moved to the up position as shown and still the high pressure fluid passes from the line 98 to the line 63 and finally to the air valve actuator 49 to hold the air valve 55 in the open position.

Figure 8G:
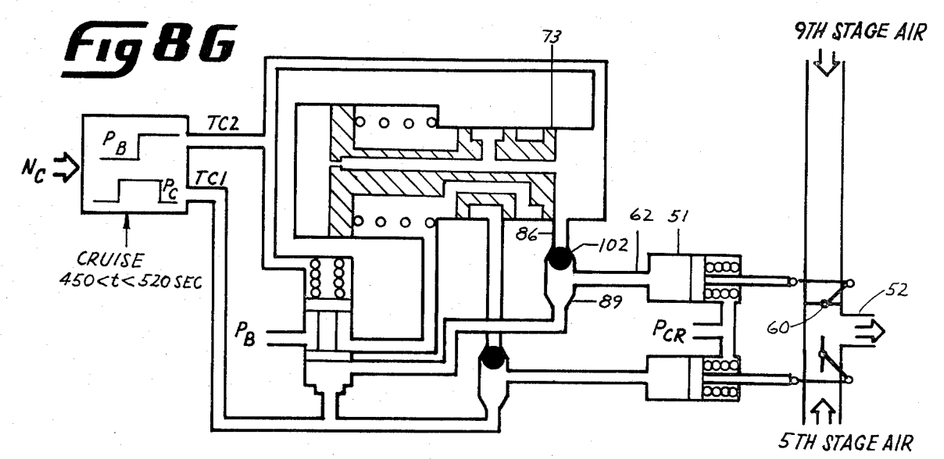

After 450 seconds, the piston 66 has moved to the position as shown in FIG. 8g wherein the land 73 has passed to the left side of the port entering the line 86. There remains a low pressure on top of the ball 102 and a high pressure below the ball and, in the line 62 and in the air valve 51 to hold the air valve 60 in the closed position.

Figure 8H:
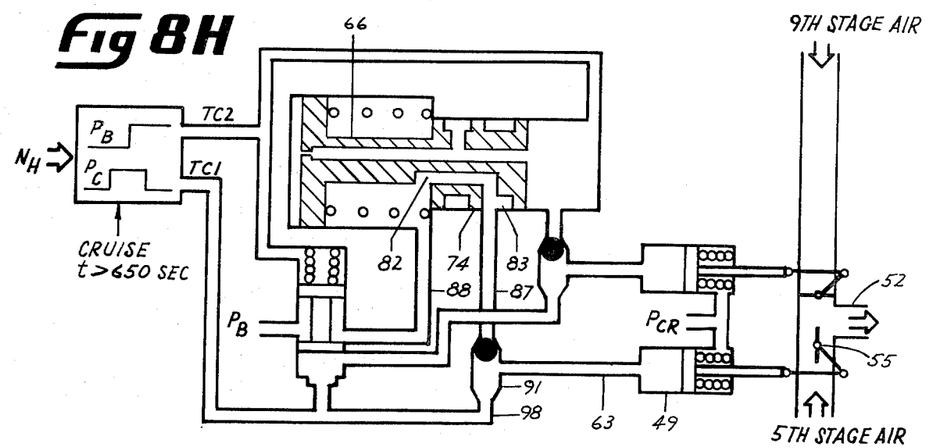

After 650 seconds of cruise operation, the piston 66 has traveled to the full left position as shown in FIG. 8h such that the land 74 has passed to the left side of the port entering the line 87 so as to expose that line to the low pressure $P_B$ fluid which travels along line 88 to the passage 82 and to the cavity 83. Again, the high pressure fluid from the line 98 passes through the maximum pressure selector 91 and the line 63 to hold the air valve 55 in the open position. The system will remain in this condition as long as this cruise speed is maintained.

It should be noted that during the period in which the piston 66 is retracting, as represented by the downward sloping line in FIG. 7, if the speed is then increased to above the 13,400 rpm cruise mode threshhold, the piston 66 will then begin to advance back to the right on an advancement schedule as described hereinabove. However, it will pick up where the retraction stopped rather than starting at the far left position. For example, if after 200 seconds of retraction, the speed is again increased to the takeoff level of 14,000 rpm, the piston 66 will have retracted down to the 65 percent travel position as represented by A on the graph of FIG. 7. The piston will then begin to advance along the advancement schedule from the position B as shown and will at that time change from fifth stage cooling air only to ninth stage cooling air only.

Figure 8I:
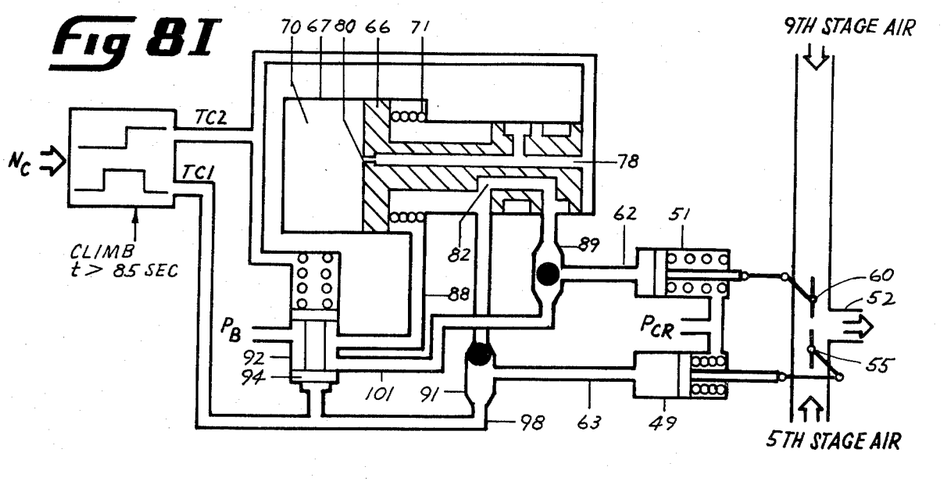

If the engine is operated at cruise for 200 seconds so that the piston 66 is at the position A in FIG. 7, and the engine is then accelerated to a climb range, between 13,400 and 14,000 rpm, then the system will adjust to the condition as shown in FIG. 8i. Here both the $TC_1$ and the $TC_2$ signals are at the high $P_C$ pressure and the higher pressure fluid will thus enter the passage 78, the orifice 80 and the head end cavity 70 to reverse the direction of the piston 66 and start it back again on its advancement schedule from the point B of FIG. 7. The high pressure $TC_1$ signal will pass along line 98 through the maximum pressure selector 91 through the line 63 and to the air valve actuator 49 to hold the valve 55 in the open position to permit the flow of fifth stage air. Now at the mixer valve 92 there is a high pressure at both ends and therefore the piston 94 will remain in the spring-biased lower position as shown and the lower pressure signal $P_B$ will be present in the line 101 and the maximum pressure selector 89 such that the pressure fluid entering the line 62 and the air valve actuator 51 will be at a low pressure and permit the air valve 60 to open and allow the flow of ninth stage air to the air-valve discharge port 52. Thus, this mixed flow mode will continue as long as operation of the engine is within the climb range of speeds between 13,400 and 14,000 rpm.

Figure 8J:
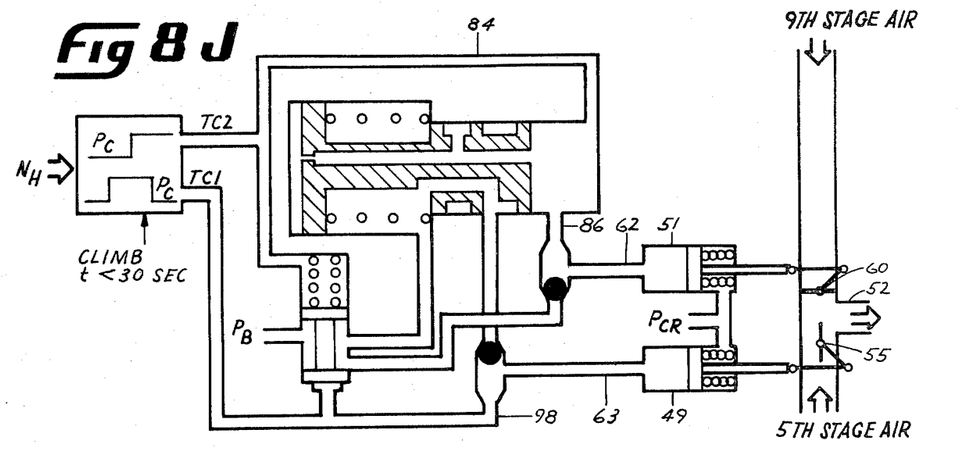

Now if the system has been operating in the cruise mode for the full 650 seconds and the piston 66 has thus traveled to the far left position, the fifth stage air will continue to flow until another steady-state mode is called for. If the speed is now advanced to the climb range, between 13,400 and 14,000 rpm, the timer will again begin to advance from the zero position of FIG. 7 and will sequence through the various conditions as shown by FIGS. 8j through 8m. In FIG. 8j, both the $TC_1$ and $TC_2$ have the high pressure $P_C$ signals. The high pressure $TC_2$ signal exists in line 84, line 86 and line 62 to hold the air valve 60 in the closed position. The high pressure $TC_1$ signal passes along line 98 and line 63 to the air valve actuator 49 to hold the valve 55 in the open position to allow fifth stage air to enter the air valve discharge port 52.

Figure 8K:
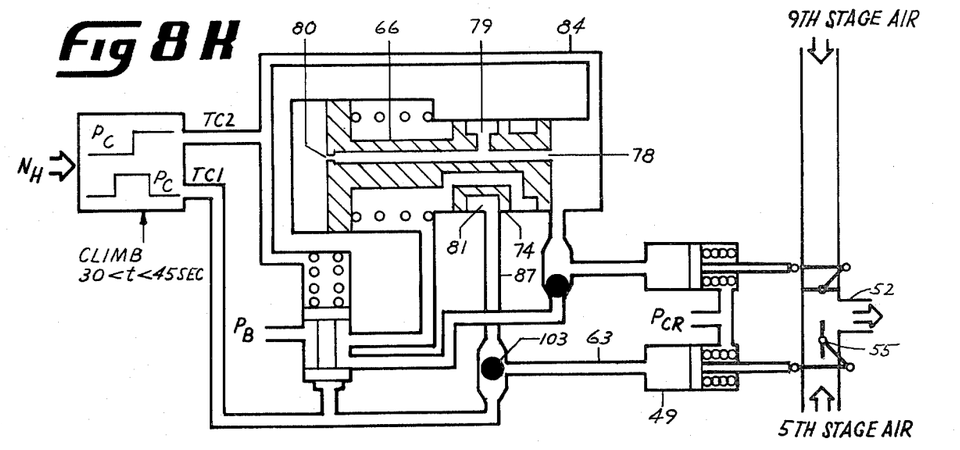

After thirty seconds, the piston 66 has traveled to the position as shown in FIG. 8k wherein the land 74 has passed to the right side of the entrance to the line 87. The high pressure fluid from line 84 thus enters the port 79, the cavity 81 and the line 87, providing high pressure fluid to both sides of the ball 103. Still there is a high pressure in the line 63 and to the air valve actuator 49 to hold the valve 55 in the open position as before.

Figure 8L:
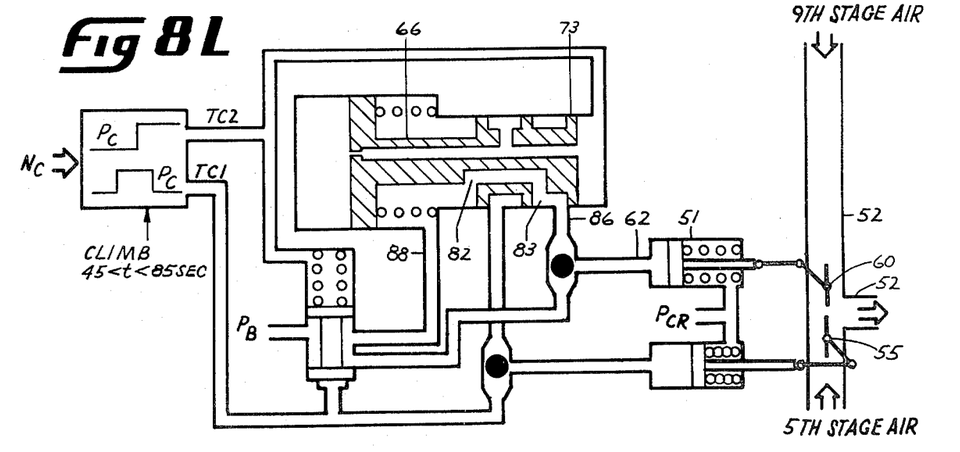

After forty-five seconds, the piston 66 has advanced to the position as shown in FIG. 8l wherein the land 73 has passed to the right side of the port entering the line 86. Now the fluid at a low pressure $P_B$ from the line 88, the passage 82, the cavity 83 and the line 86 provides a low pressure condition in line 62 such that the air valve 60 moves to the normally open position to introduce ninth stage air to the available discharge port 52.

Figure 8M:
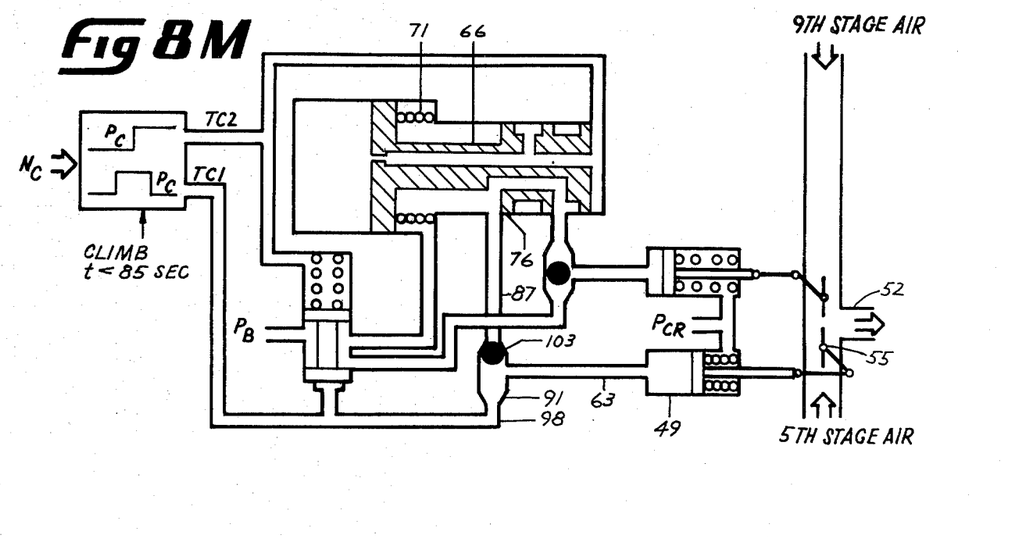

After eighty-five seconds of operation, the piston 66 has moved to the position as shown in FIG. 8m wherein the land 76 has passed to the right side of the port entering the line 87. This presents a low pressure fluid to the maximum pressure selector 91 to allow the ball 103 to move to the position as shown. However, the high pressure fluid from the line 98 still passes to the line 63 and the air valve actuator 49 to hold the valve 55 in the open position. The piston 66 will commence the overtravel mode with the fifth and ninth stage air mixture persisting as long as the climb mode of operation is continued. If the speed is then decreased to the cruise or idle mode, the piston will again go into the retraction schedule on a slope as indicated in FIG. 7.

It will be understood that many combinations of the particular cooling system described hereinabove may be selected by one skilled in the art without departing from the true spirit and scope of the invention. For example, although the invention has been described in terms of operation at particular core speeds and ranges, it may just as well be exercised by the use of other schedules, speeds and missions to suit any particular operating requirement. Further, the schedule may be periodically modified slightly as necessary to account for performance changes brought about by age. Other possibilities would include the use of alternate air sources, speed sensing apparatus and/or support cooling arrangements.

Having thus described the invention, what is claimed as novel and desired to be secured by Letters Patent of the United States is:

1. In combination with apparatus of the type having a variable speed rotor, a shroud, and a shroud support with the shroud surrounding the rotor, an improved air delivery system for modulating thermal growth of the shroud support comprising:
   (a) means for sensing the operating speed of the rotor;
   (b) means for timing the operation of the rotor after an acceleration; and
   (c) means responsive to said timing means and to the speed of the rotor for varying the temperature of the air.

2. An air delivery system as set forth in claim 1 wherein said temperature varying means includes first and second air sources, the temperature of said second air source being higher than that of said first air source.

3. An air delivery system as set forth in claim 1 wherein the means of (c) includes means for increasing the temperature of the air in increments in response to said timing means.

4. An air delivery system as set forth in claim 2 wherein said temperature varying means provides air only from said second air source during idle operation.

5. An air delivery system as set forth in claim 2 wherein said temperature varying means initially provides no air for a predetermined time period after acceleration.

6. An air delivery system as set forth in claim 2 wherein said temperature varying means provides air only from said first air source for a predetermined time period after acceleration.

7. An air delivery system as set forth in claim 2 wherein said temperature varying means provides a mixture of air from both said first and second air sources for a predetermined time period after acceleration.

8. An air delivery system as set forth in claim 2 wherein said temperature varying means provides air only from said second air source for a predetermined time period after acceleration.

9. An air delivery system as set forth in claim 1 and including means for timing the operation of the rotor after a deceleration and means for varying the temperature of the air in response to said deceleration.

10. An air delivery system as set forth in claim 9 wherein said temperature varying means provides air only from said first air source.

11. An air delivery system as set forth in claim 1 and including means for overriding said timing means for varying the temperature of the air in response to predetermined rotor speed changes.

12. A method for modulating thermal growth of a rotor surrounding shroud comprising the steps of:
    (a) sensing the operating speed of the rotor;
    (b) timing the operating of the rotor after an acceleration thereof;
    (c) varying the temperature of an air supply in response to said time and to the operating speed of the rotor; and
    (d) providing for the flow of said air supply to the shroud support.

13. A method as set forth in claim 12 wherein the temperature of said air supply is increased in increments during the timing step.

14. A method as set forth in claim 12 wherein the temperature varying step is accomplished by the selective use of first and second air sources, the temperature of said second air source being higher than that of said first air source.

15. A method as set forth in claim 14 wherein said temperature varying step is accomplished by using air only from said second air source during idle operation.

16. A method as set forth in claim 14 wherein said temperature varying step is accomplished by initially providing no air for a predetermined time period after acceleration.

17. A method as set forth in claim 14 wherein said temperature varying step is accomplished by providing air only from said first air source for a predetermined time period after acceleration.

18. A method as set forth in claim 14 wherein said temperature varying step is accomplished by providing a mixture of air from both said first and second air sources for a predetermined time period after acceleration.

19. A method as set forth in claim 14 wherein said temperature varying step includes the step of providing air only from said second air source for a predetermined time period after acceleration.

20. A method as set forth in claim 12 and including the step of timing the operation of the rotor after a deceleration and varying the temperature of the air in response to said deceleration.

21. A method as set forth in claim 20 wherein said temperature varying step is accomplished by providing air only from said first air source following deceleration.

22. A method as set forth in claim 12 and including the step of overriding said timing means for varying the temperature of the air in response to predetermined rotor speed changes.

23. An improved turbomachinery apparatus of the type having a rotor, a stationary shroud, a shroud support structure and means for changing the temperature of the support structure to regulate the clearance between the rotor and the shroud wherein the improvement comprises:
 (a) means for sensing the operating speed of the rotor;
 (b) means for timing the operation of the rotor after an acceleration;
 (c) a first source for providing air at a first temperature;
 (d) a second source for providing air at a second temperature higher than said first temperature;
 (e) mixer means for providing a flow of air from selective combinations of said first and second temperature air wherein said mixer means is responsive to the timing means and to the speed of the rotor; and
 (f) means for introducing the flow of air on the shroud support structure to modulate its thermal growth.

24. An improved turbomachinery apparatus as set forth in claim 23 wherein said first and second sources comprise compressor bleed sources.

25. An improved turbomachinery apparatus as set forth in claim 23 having a compressor wherein said first source comprises a bleed air manifold from an intermediate stage of the compressor.

26. An improved turbomachinery apparatus as set forth in claim 23 having a compressor wherein said second source comprises a bleed air manifold from the later stage of the compressor.

27. An improved turbomachinery apparatus as set forth in claim 23 wherein said flow introducing means includes an impingement shroud for impinging the flow of air on the shroud support structure.

28. An improved turbomachinery apparatus as set forth in claim 23 wherein said mixer means provides air only from said second air source during idle operation.

29. An improved turbomachinery apparatus as set forth in claim 23 wherein said mixer means initially provides no air for a predetermined time period after acceleration.

30. An improved turbomachinery apparatus as set forth in claim 23 wherein said mixer means provides air only from said first air source for a predetermined period after acceleration.

31. An improved turbomachinery apparatus as set forth in claim 23 wherein said mixer means provides a mixture of air from both said first and second air sources for a predetermined time period after acceleration.

32. An improved turbomachinery apparatus as set forth in claim 23 wherein said mixer means provides air only from said second air source during a predetermined time period after acceleration.

33. An improved turbomachinery apparatus as set forth in claim 23 and including means for timing the operation of the rotor after a deceleration and means for varying the temperature of the air in response to said deceleration.

34. An improved turbomachinery apparatus as set forth in claim 33 wherein said temperature varying means provides air only from said first air source.

35. An improved turbomachinery apparatus as set forth in claim 23 and including means for overriding said timing means for varying the temperature of the air in response to predetermined rotor speed changes.

36. An improved turbomachinery apparatus as set forth in claim 23 wherein said mixer means includes means for timing predetermined modes of operation of the turbomachine.

37. An improved turbomachinery apparatus as set forth in claim 36 wherein said means for timing is activated when the speed of the turbomachine is advanced beyond a predetermined level.

* * * * *